Sept. 4, 1962  S. F. REED  3,052,168
AUTOMATIC CAMERA
Filed Jan. 17, 1958  2 Sheets-Sheet 1

INVENTOR
STANLEY F. REED

BY *Leo Wilder*

ATTORNEY

Sept. 4, 1962          S. F. REED          3,052,168

AUTOMATIC CAMERA

Filed Jan. 17, 1958          2 Sheets-Sheet 2

INVENTOR

STANLEY F. REED

BY *Leo Wilder*

ATTORNEY

United States Patent Office 3,052,168
Patented Sept. 4, 1962

3,052,168
AUTOMATIC CAMERA
Stanley F. Reed, Falls Church, Va., assignor to Reed Research Inc., Washington, D.C., a corporation of Delaware
Filed Jan. 17, 1958, Ser. No. 709,486
13 Claims. (Cl. 95—10)

This invention relates to an automatic camera and more particularly to a completely automatic camera having provision whereby it need only be pointed at an object to be photographed, and the shutter snapped; the camera will then automatically take a picture of the subject with full independent correction of intensity and exposure over all of the separate portions of the picture area.

The source of light cannot be controlled in outdoor photography, and only partially in a studio, and is mostly a matter of individual judgment. The latitude of all known films is insufficient to register all details in most scenes. In addition "vignetting" occurs generally in most cameras using lenses to collect light causing a fall-off in intensity at the extremities. The various known "dodging" techniques, as by the use of shaded masks or "unsharp mask" technique are time consuming and expensive.

Automatic exposure cameras are known which, in effect, measure the total intensity of illumination in the field of view which is to be photographed, and adjust the total amount of light admitted into the camera in accordance with the average intensity of illumination from this field of view. While this is, of course, a useful correction, in a practical situation it usually occurs that the intensity of illumination of the different portions of the field of view varies very widely in any given scene. If the exposure, whether automatic or manual, is correct for one portion of the scene, it will usually not be correct for those other portions which are either very brightly illuminated or conversely are very little illuminated as in the case where portions of the picture are in dark shadow while other portions are in bright sunlight. Under these conditions, no possible exposure will produce a perfect picture. The amount of light falling on the brightly illuminated portions of the negative will be too great for correct detail, while the same will be true for the under-illuminated portions of the picture, since in both cases the illumination intensity will not be correct for optimum contrast which is necessary to show the greatest amount of detail. It is true that such lack of detail in the negative can to some extent be corrected in printing as by use of "unsharp masks," graded density filters, etc., or, in a more sophisticated fashion by the use of servo-controlled scanning light source in printing as is done by the "logEtron" described in Photographic Engineering, vol. 5, No. 4, 1954, pages 219–226. However, all of these requirements would be unnecessary if the negative were correctly exposed in the first place.

To produce such correct exposure in the taking of the picture is the primary object of the present invention.

Another object of the invention is to remove any factor of judgment in the taking of pictures by providing an automatic means for insuring correct exposure of every portion of the negative during the taking of a picture.

Still another object is to provide a unitary and comparatively simple portable camera with completely automatic means for enabling correct exposure of all pictures.

The above and other objects of the invention are accomplished by providing automatic means for scanning the field of view which embraces the picture to be taken so that light from discrete areas of said field of view is admitted continuously and successively to the respective discrete areas of the negative, and automatically controlling the intensity of the admitted light from each individual area so that each such area receives a predetermined and correct amount of light. This is preferably accomplished by means of a scanning disk similar to the early Nipkow disks used in television having a number of overlapping perforations which successively traverse the field of view and admit light from the field to successive different portions of the negative until the entire negative has been exposed. During this process, the admitted light is measured continuously and the amount of light admitted from the field of view to the scanning disc is continuously varied so that each discrete area of the negative receives the correct amount of exposure.

The scanning disc holes are of such design that scanning lines do not appear. This can be done by making the projected spot take the shape of a diamond or hexagon, as will be explained below. By overlapping the two sides at the half area point, horizontal streaks can be eliminated.

A further advantage of exposing with a spot is that increase in resolution can be obtained by this means since such diffusion from other parts of the image is not allowed to fall on the film.

The specific nature of the invention, as well as other objects and advantages thereof, will clearly appear from a description of a preferred embodiment as shown in the accompanying drawings in which.

Figure 1:
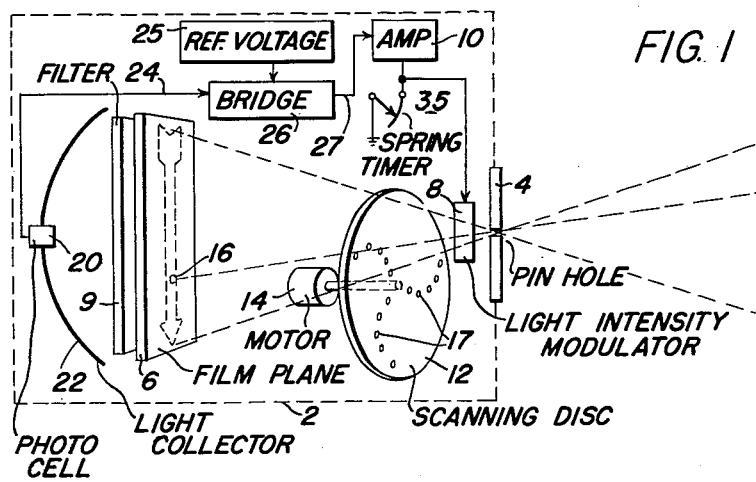
FIG. 1 is a schematic diagram illustrating the principle of the invention using light transmitted through the negative.

Referring to FIG. 1, the entire camera equipment will be housed in a suitable box or enclosure diagrammatically indicated by dotted line 2. For purpose of illustration, the camera will be indicated as of the pin-hole type having a pin-hole aperture 4 for the admission of light and the formation of a picture on negative 6. However, it will be understood that instead of a pin-hole, any suitable or conventional lens arrangement may be used. The mechanical details of lens mounting, and means for holding the film in place will not be shown, as these may be of any conventional design or construction. Conventional cameras are provided with means for controlling the amount of light admitted to the negative, commonly in the form of an adjustable iris which is mechanically controlled to provide various sized apertures in accordance with the intensity of illumination of the subject. A light intensity modulator is also required in the present invention, but since it must be operated at speeds in the order of thousands of times faster than it is conventional to manipulate the mechanical iris of standard cameras, it will be apparent that a standard mechanical light shutter would not be suitable for the present purpose. I therefore use an electrically controlled light intensity modulator 8 which may be a Kerr cell instantaneously controlled by the output of amplifier 10, or may be any other known form of high-speed electrical light intensity modulator, such as the Bawel Optical Company's "Rapitronic" Shutter. The amount of light passed through pin-hole 4 into the interior of the camera is therefore instantaneously controlled in accordance with the output of amplifier 10.

Between pin-hole 4 and the negative 6 is provided a scanning disc 12 suitably rotated by motor 14 which may be a small high speed electric motor driven by a self-contained battery (not shown) or, for some purposes, may be an alternating current motor driven by a suitable external alternating current supply. The scanning disc 12 is provided with at least one, and preferably several, spiral rows of apertures 17 of a special shape, as will be shown below, so spaced and arranged that as the disc rotates, only one aperture at a time is between the pin-hole and the negative. In this manner, light from the object being photographed is blocked from access to the negative except along a small area as shown at 16 on the negative, corresponding to the light received from area 16' of the scene being photographed. As soon as any individual aperture 17 of the scanning disc begins to leave the far edge of the negative, light from the next succeeding aperture in the spiral row of apertures under consideration begins to enter the opposite edge of the negative, so that at all times the negative is illuminated by an amount of light corresponding to a single aperture of the scanning disc. The intensity of this light is, of course, instantaneously controlled by the intensity modulator 8 in accordance with the output of amplifier 10. This output is in turn controlled in accordance with the amount of light received by the negative at any instant from the discrete area 16' of the scene which is being observed at that instant. This is accomplished by means of a light senser 20 which may be a photo-electric cell of any known type, producing an electrical output which is a function of the light received by it. A light collector 22 which may be a reflecting hood of any suitable configuration is used to insure that light transmitted through any portion of the negative ultimately falls upon the light sensitive cell through graduated filter 9.

Since the apertures 17 of scanning disc 12 move faster at the periphery of the disc than at the center, more light must pass through these apertures to produce an equal exposure of the film by each aperture. But the photo-cell 20 reacts equally to light passing through each aperture since they are of the same size. Filter 9 is therefore provided to cause photocell 20 to present an indication of the rate of exposure of the film rather than the amount of light falling on the film through each aperture. This causes light intensity modulator 8 to transmit proportionally more light through the faster moving apertures at the edge of the scanning disc. Alternatively, the apertures may be made slightly larger at the periphery to permit more light to pass through them.

The voltage output of the cell on line 24 is therefore a function of the light received by the cell. This voltage output is compared with a reference voltage corresponding to the correct light intensity for the particular negative being used, and a difference voltage is produced in bridge 26 which may be termed an error detecting circuit, since its output on line 27 is a function of the incorrectness of the light intensity on the portion of the negative being observed. This signal is amplified by amplifier 10 and the output of the amplifier, with such direction as will produce a correction, is applied to the light intensity modulator 8 to thus correct the intensity of light admitted to the negative instantaneously and continuously to produce the optimum exposure of the film over all areas.

Although an electric motor 14 has been indicated as the driving source for the disc, it will be understood that a spring motor may be used instead, which may be manually pre-wound or may be wound by digital pressure as the shutter is being depressed. In practice, in order to admit sufficient light, it will usually be desirable to run the disc at a fairly high speed and for a sufficient number of revolutions during the taking of a picture so that the necessary amount of light falls upon the film, since, if, for example, the area of the spot is in the order of 1/50 the area of the total picture, then obviously the duration of the total picture taking process using a scanning disc will be fifty times as long as if the entire area of the film were illuminated at once. However, with modern high speed films, it will still be possible to take the picture in a reasonable amount of time. The intensity of light must also, of course, be sufficient to actuate the photocell. This criterion is aggravated by the antihalation coatings on most film which under extreme conditions will not allow sufficient light to reach the photocell. This can be corrected for by use of a partially silvered mirror in the way of the spot, as will be shown below.

Figure 2:
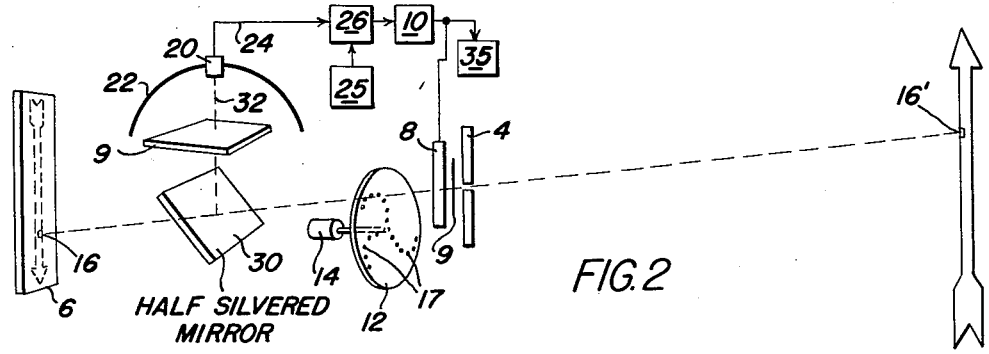
FIG. 2 is a similar schematic diagram showing a modification wherein the light from the field of view is measured before it reaches the negative.

Alternatively, as shown in FIG. 2, instead of adjusting the light intensity in accordance with light transmitted through the negative 6, some of the light may be intercepted before it reaches the negative. This may be done by means of a half-silvered mirror 30, arranged to reflect a certain portion of the light from area 16', as indicated by beam 32 toward the photoelectric cell 20. This has the advantage of responding directly to the intensity of light received from the scene, without the necessity of passing it through the negative; however, it also reduces the intensity of light reaching the negative, and thus requires a longer exposure, other things being equal. In all other essential respects, the systems of FIGS. 1 and 2 are similar.

In both arrangements, a spring operated timer 35 is actuated by initial operation of the camera, and after a predetermined period, which depends essentially upon the speed of the negative being used, the picture-taking operation is terminated. This may be accomplished by the timer by controlling the electric circuit so that the intensity modulator no longer passes light, as shown, or may also be done by means of a mechanical shutter arrangement which covers the pin-hole or lens aperture.

Figure 3:
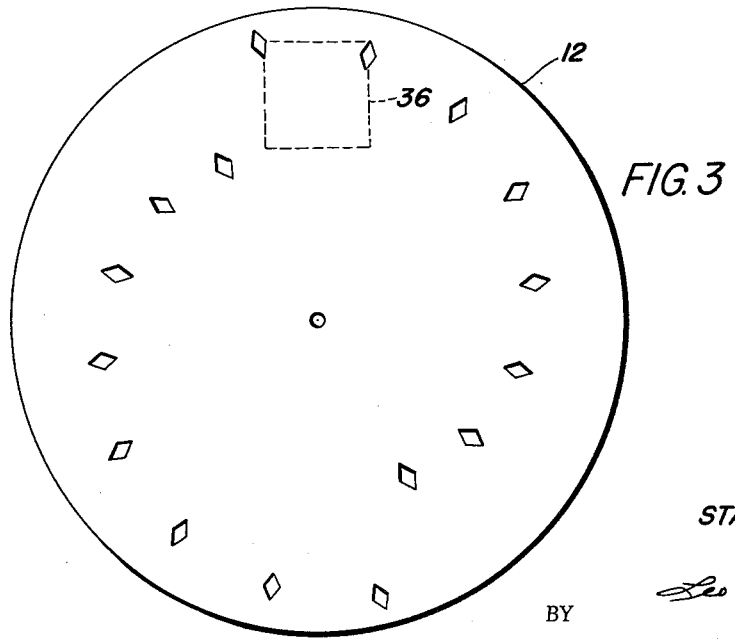
FIGURE 3 is a front view of a typical scanning disc showing overlapping apertures designed to admit equal amounts of light to all parts of the negative.

FIG. 3 shows a front view of the scanning disc 12 with a row of successive apertures which are preferably overlapped so that, in a uniform light field, the total intensity of illumination admitted to the area of the negative (indicated in dotted lines at 36) will be uniform in the radial direction with respect to the disc. It will be understood that the same effect could be produced by using rectangular apertures with the edge of each aperture exactly in line with the bottom edge of the preceding aperture, but this would require an extremely high precision of manufacture, and it is found simpler in practice, to use tapered apertures as shown so that the total light admitted at all radial distances from the center of the disc will be the same. An alternative form of aperture configuration may use hexagonal apertures which overlap at the midpoints of two adjacent sides. This obviously will also produce the same effect. It will be apparant that various other configurations may be employed.

Figure 4:
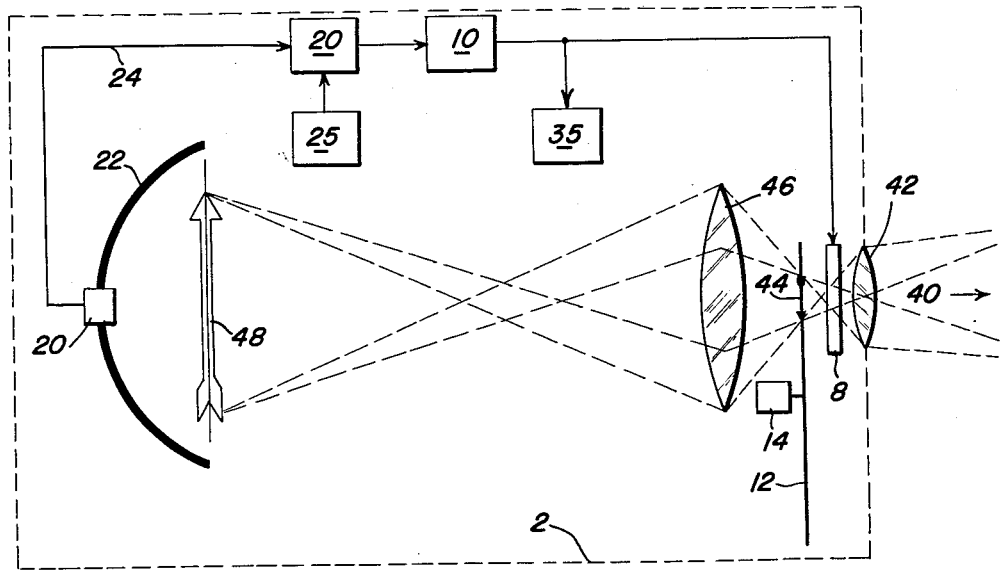
FIGS. 4 and 5 illustrate the use of a lens instead of a pinhole for the camera.

FIGURE 4 shows the principle of a double lens optical system which may be used instead of the pinhole of FIGS. 1 and 2. In this case, light from the scene 40 passes through lens 42 and is focussed in plane 44; a second lens 46 then erects and refocusses the image at plane 48. As used in a camera, lenses 42 and 46 are suitably mounted in a camera box 2. Scanning disc 12 is located in the plane 44 and driven by motor 14; and the film is located in plane 48. Intensity modulator 8 is located between lens 42 and the scanning disc.

Figure 5:
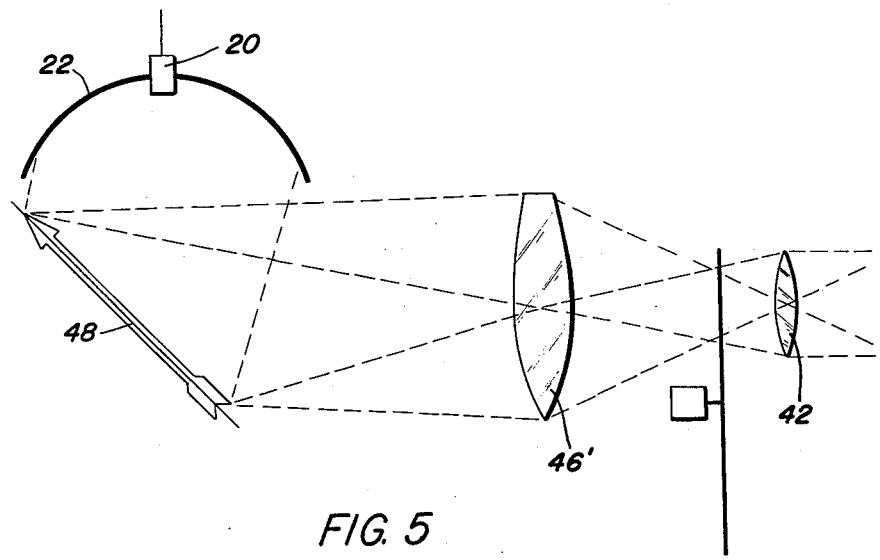

FIGURE 5 shows an alternative configuration of a double lens system to provide for sensing of light reflected from the record surface 48 in photocell 20. Lens 46' is constructed so as to distort the image by proportionally widening it, so that when it falls on inclined surface 48 it is back in proportion. Light collector 22 collects light reflected from the film. This system does not depend upon the transparency of the film for operation as in FIG. 1, nor does it reduce the amount of light from the object reaching the film, as in FIG. 2.

The invention can, of course, also be applied to color photography in which case the system would, in general, be the same as shown above with the exception that it is possible to correct the colors automatically by adding two photocells or a double cell, one of which is sensitive in the red region of the spectrum and the other sensitive in the blue. This is similar to the new General Electric Color Control Meter, which gathers and evaluates the light from both ends of the spectrum. Any unbalance is picked up, amplified and fed to a variable color filter similar to that recently announced by General Electric Company as the Variable Color Filter where rotation of one filter against the other changes the wavelength of the admitted light. A complete servo, or negative feedback loop is thus established providing automatic color balance. By including other reference voltages, it is possible to maintain any color balance or imbalance required. In combination with the automatic exposure feature, this would correct only where correction is needed.

It is also possible to use two or three photocells, sensitive in the red, yellow and blue regions of the spectrum. The outputs are added for control of the light modulator but are separately attenuated or boosted prior to adding, depending on the response of the film. In other words, a red deficient film when confronted with a spot predominately in the red would allow more light to enter than would normally be expected. Thus a red image would be intensified and a blue image subdued.

It will be apparent that the embodiments shown are only exemplary and that various modifications can be made in construction and arrangement within the scope of my invention as defined in the appended claims.

Having thus described an exemplary embodiment thereof, what I desire to claim as my invention is:

1. An automatic camera system comprising, in combination, a supporting housing having at least one wall, a light-admitting aperture in said wall, an object field external to said housing so positioned that light therefrom is transmitted through said aperture, a light-sensitive record surface so positioned within said housing that at least a portion of the light admitted through said aperture from said object field is received thereby, said record surface having a predetermined exposure area, said predetermined exposure area having substantial width and height dimensions, said object field consisting of a multiplicity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means operatively associated with said aperture and said record surface, said scanning means including an opaque surface having a series of light-transmitting apertures therein, each aperture of said series of apertures displaced from every other aperture of said series and arranged in such a manner that the operation of said scanning means causes light from each elemental area of said object field to illuminate only the elemental area of said record surface optically associated therewith, said record surface, said light-admitting aperture, and said scanning means so oriented that all light received by said record surface has been transmitted through said light-transmitting apertures, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures to produce an electrical signal, said light modulating means and said electrical signal of said photoelectric means connected by electrical means adapted to provide the optimum light intensity for the exposure of every elemental area of said record surface, thereby producing the optimum overall exposure of said record surface.

2. An automatic camera system comprising, in combination, a supporting housing having at least one wall, a light-admitting aperture in said wall, an object field external to said housing so positioned that light therefrom is transmitted through said aperture, a light-sensitive partially translucent record surface so positioned within said housing that at least a portion of the light admitted through said aperture from said object field is received thereby, said record surface having a predetermined exposure area, said predetermined exposure area having substantial width and height dimensions, said object field consisting of a multiplicity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means operatively associated with said aperture and said record surface, said scanning means including an opaque surface having a series of light-transmitting apertures therein, each aperture of said series of apertures displaced from every other aperture of said series and arranged in such a manner that the operation of said scanning means causes light from each elemental area of said object field to illuminate only the elemental area of said record surface optically associated therewith, said record surface, said light-admitting aperture, and said scanning means so oriented that all light received by said record surface has been transmitted through said light-transmitting apertures of said scanning means, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures and transmitted through said record surface to produce an electrical signal, said light modulating means and said electrical signal of said photoelectric means connected by electrical means adapted to provide the optimum light intensity for the exposure of every elemental area of said record surface, thereby producing the optimum overall exposure of said record surface.

3. An automatic camera system comprising, in combination, a supporting housing having at least one wall, a light-admitting aperture in said wall, an object field external to said housing so positioned that light therefrom is transmitted through said aperture, a light-sensitive record surface so positioned within said housing that at least a portion of the light admitted through said aperture from said object field is received thereby, said record surface having a predetermined exposure area, said predetermined exposure area having substantial width and height dimensions, said object field consisting of a multiplicity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means operatively associated with said aperture and said record surface, said scanning means including an opaque surface having a series of light-transmitting apertures therein, each aperture of said series of apertures displaced from every other aperture of said series and arranged in such a manner that the operation of said scanning means causes light from each elemental area of said object field to illuminate only the elemental area of said record surface optically associated therewith, a partially reflecting surface positioned within said housing intermediate said light-admitting aperture and said record surface, said record surface, said light-admitting aperture, said partially reflecting surface, and said scanning means so oriented that all light received by said record surface has been transmitted through said light-transmitting apertures and said partially reflecting surface, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures and thereafter reflected from said partially reflecting surface to produce an electrical signal, said light modulating means and said electrical signal of said photoelectric means connected by electrical means adapted to provide the optimum light intensity for the exposure of every elemental area of said record surface, thereby producing the optimum overall exposure of said record surface.

4. An automatic camera system comprising, in combination, a supporting housing having at least one wall, a light-admitting aperture in said wall, an object field external to said housing so positioned that light therefrom is transmitted through said aperture, a light-sensitive record surface so positioned within said housing that at least a portion of the light admitted through said aperture from said object field is received thereby, said record surface having a predetermined exposure area, said predetermined exposure area having substantial width and height dimensions, said object field consisting of a multiplicity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means operatively associated with said aperture and said record surface, said scanning means including an opaque surface having a series of light-transmitting apertures therein, each aperture of said series of apertures displaced from every other aperture of said series and arranged in such a manner that the operation of said scanning means causes light from each elemental area of said object field to illuminate only the elemental area of said record surface optically associated therewith, said record surface, said light-admitting aperture, and said scanning means so oriented that all light received by said record surface has been transmitted through said light-transmitting apertures, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures to produce an electrical signal, means for providing an electrical reference signal corresponding to a predetermined light intensity dependent upon the characteristics of said record surface, means for comparing said electrical signal produced by said photoelectric means with said electrical reference signal, means responsive to said means for comparing for producing a corrective electrical signal, said corrective electrical signal applied to said light modulating means in such direction as to provide the optimum light intensity for the exposure of every elemental area of said record surface, thereby producing the optimum overall exposure of said record surface.

5. An automatic camera system comprising, in combination, a supporting housing having at least one wall, a light-admitting aperture in said wall, an object field external to said housing so positioned that light therefrom is transmitted through said aperture, a light-sensitive record surface so positioned within said housing that at least a portion of the light admitted through said aperture from said object field is received thereby, said record surface having a predetermined exposure area, said predetermined exposure area having substantial width and height dimensions, said object field consisting of a multiplicity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means operatively associated with said aperture and said record surface, said scanning means including an opaque surface having a series of light-transmitting apertures therein, each aperture of said series of apertures displaced from every other aperture of said series and arranged in such a manner that the operation of said scanning means causes light from each elemental area of said object field to illuminate only the elecental area of said record surface optically associated therewith, said record surface, said light-admitting aperture, and said scanning means so oriented that all light received by said record surface has been transmitted through said light-transmitting apertures, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures to produce an electrical signal, said light modulating means and said electrical signal of said photoelectric means connected by electrical means adapted to provide the optimum light intensity for the exposure of every elemental area of said record surface, and means operatively associated with said electrical means for exposing each elemental area of said predetermined exposure area a predetermined multiplicity of times dependent upon the light-sensitivity characteristics of said record surface, thereby producing the optimum overall exposure of said record surface.

6. An automatic camera system comprising, in combination, a supporting housing having at least one wall, a light-admitting aperture in said wall, an object field external to said housing so positioned that light therefrom is transmitted through said aperture, a light-sensitive partially translucent record surface so positioned within said housing that at least a portion of the light admitted through said aperture from said object field is received thereby, said record surface having a predetermined exposure area, said predetermined exposure area having substantial width and height dimensions, said object field consisting of a multiplicity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means operatively associated with said aperture and said record surface, said scanning means including an opaque surface having a series of light-transmitting apertures therein, each aperture of said series of apertures displaced from every other aperture of said series and arranged in such a manner that the operation of said scanning means causes light from each elemental area of said object field to illuminate only the elemental area of said record surface optically associated therewith, said record surface, said light-admitting aperture, and said scanning means so oriented that all light received by said record surface has been transmitted through said light-transmitting apertures, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures and transmitted through said record surface to produce an electrical signal, said light modulating means and said electrical signal of said photoelectric means connected by electrical means adapted to provide the optimum light intensity for the exposure of every elemental area of said record surface, and means operatively associated with said electrical means for exposing each elemental area of said predetermined exposure area a predetermined multiplicity of times dependent upon the light-sensitivity characteristics of said record surface, thereby producing the optimum overall exposure of said record surface.

7. An automatic camera system comprising, in combination, a supporting housing having at least one wall, a light-admitting aperture in said wall, an object field external to said housing so positioned that light therefrom is transmitted through said aperture, a light-sensitive record surface so positioned within said housing that at least a portion of the light admitted through said aperture from said object field is received thereby, said record surface having a predetermined exposure area, said predetermined exposure area having substantial width and height dimensions, said object field consisting of a multiplicity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means operatively associated with said aperture and said record surface, said scanning means including an opaque surface having a series of light-transmitting apertures therein, each aperture of said series of apertures displaced from every other aperture of said series and arranged in such a manner that the operation of said scanning means causes light from each elemental area of said object field to illuminate only the elemental area of said record surface optically associated therewith, a partially reflecting surface positioned within said housing intermediate said light-admitting aperture and said record surface, said record surface, said light-admitting aperture, said partially reflecting surface, and said scanning means so oriented that all light received by said record surface has been transmitted through said light-transmitting apertures and said partially reflecting surface, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures and thereafter reflected from said partially reflecting surface to produce an electrical signal, said light modulating means and said electrical signal of said photoelectric means connected by electrical means adapted to provide the optimum light intensity for the exposure of every elemental area of said record surface, and means operatively associated with said electrical means for exposing each elemental area of said predetermined exposure area a predetermined multiplicity of times dependent upon the light-sensitivity characteristics of said record surface, thereby producing the optimum overall exposure of said record surface.

8. An automatic camera system comprising, in combination, a supporting housing having at least one wall, a light-admitting aperture in said wall, an object field external to said housing so positioned that light therefrom is transmitted through said aperture, a light-sensitive record surface so positioned within said housing that at least a portion of the light admitted through said aperture from said object field is received thereby, said record surface having a predetermined exposure area, said predetermined exposure area having substantial width and height dimensions, said object field consisting of a multiplicity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means operatively associated with said aperture and said record surface, said scanning means including an opaque surface having a series of light-transmitting apertures therein, each aperture of said series of apertures displaced from every other aperture of said series and arranged in such a manner that the operation of said scanning means causes light from each elemental area of said object field to illuminate only the elemental area of said record surface optically associated therewith, said record surface, said light-admitting aperture, and said scanning means so oriented that all light received by said record surface has been transmitted through said light-transmitting apertures, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures to produce an electrical signal, means for providing an electrical reference signal corresponding to a predetermined light intensity dependent upon the characteristics of said record surface, means for comparing said electrical signal produced by said photoelectric means with said electrical reference signal, means responsive to said means for comparing for producing a corrective electrical signal, electrical means for applying said corrective electrical signal to said light modulating means in such direction as to provide the optimum light intensity for the exposure of every elemental area of said record surface, and means operatively associated with said electrical means for exposing each elemental area of said predetermined exposure area a predetermined multiplicity of times dependent upon the light-sensitivity characteristics of said record surface, thereby producing the optimum overall exposure of said record surface.

9. An automatic camera system comprising, in combination, a supporting housing having at least one wall, a light-admitting aperture in said wall having an axis, lens means positioned on said axis, said lens means having an optical axis and at least one focal plane within said housing, an object field external to said housing so positioned that at least a portion of the light therefrom is transmitted through said aperture and said lens means, a light-sensitive record surface so positioned within said housing that at least a portion of the light admitted through said aperture from said object field and transmitted through said lens means is transmitted thereto, said record surface having a predetermined exposure area, said predetermined exposure area having substantial width and height dimensions, said object field consisting of a multiplcity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means positioned within said housing, said scanning means including an opaque surface substantially transverse to said optical axis, said opaque surface positioned substantially in a focal plane of said lens means and intermedaite said light-admitting aperture and said record surface, said opaque surface having a series of light-transmitting apertures therein, each aperture of said series of apertures displaced from every other aperture of said series and arranged in such a manner that the operation of said scanning means causes light from each elemental area of said object field to illuminate only the elemental area of said record surface optically associated therewith, said record surface, said light-admitting aperture, and said scanning means so oriented that all light received by said record surface has been transmitted through said light-transmitting apertures, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures to produce an electrical signal, said light modulating means and said electrical signal of said photoelectric means connected by electrical means adapted to provide the optimum light intensity for the exposure of every elemental area of said record surface, thereby producing the optimum overall exposure of said record surface.

10. An automatic camera system comprising, in combination, a supporting housing having at least one wall, a light-admitting aperture in said wail having an axis, lens means positioned on said axis, said lens means having an optical axis and at least one focal plane within said housing, an object field external to said housing so positioned that at least a portion of the light therefrom is transmitted through said aperture and said lens means, a light-sensitive partially translucent record surface so positioned within said housing that at least a portion of the light admitted through said aperture from said object field and transmitted through said lens means is transmitted thereto, said record surface having a predetermined exposure area, said predetermined exposure area having substantial width and height dimensions, said object field consisting of a multiplicity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means positioned within said housing, said scanning means including an opaque surface substantially transverse to said optical axis, said opaque surface positioned substantially in a focal plane of said lens means and intermediate said light-admitting aperture and said record surface, said opaque surface having a series of light-transmitting apertures therein, each aperture of said series of apertures displaced from every other aperture of said series and arranged in such a manner that the operation of said scanning means causes light from each elemental area of said object to field illuminate only the elemental area of said record surface optically associated therewith, said record surface, said light-admitting aperture, and said scanning means so oriented that all light received by said record surface has been transmitted through said light-transmitting apertures, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures and transmitted through said record surface to produce an electrical signal, said light modulating means and said electrical signal of said photoelectric means connected by electrical means adapted to provide the optimum light intensity for the exposure of every elemental area of said record surface, thereby producing the optimum overall exposure of said record surface.

11. An automatic camera system comprising, in combination, a supporting housing having at least one wall, a light-admitting aperture in said wall having an axis, lens means positioned on said axis, said lens means having an optical axis and at least one focal plane within said housing, an object field external to said housing so positioned that at least a portion of the light therefrom is transmitted through said aperture and said lens means, a light-sensitive record surface so positioned within said housing that at least a portion of the light admitted through said aperture from said object field and transmitted through said lens means is transmitted thereto, said record surface having a predetermined exposure area, said predetermined exposure area having substantial width and height dimensions, said object field consisting of a multiplicity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means positioned within said housing, said scanning means including an opaque surface substantially transverse to said optical axis, said opaque surface positioned substantially in a focal plane of said lens means and intermediate said light-admitting aperture and said record surface, said opaque surface having a series of light-transmitting apertures therein, each aperture of said series of apertures displaced from every other aperture of said series and arranged in such a manner that the operation of said scanning means causes light from each elemental area of said object field to illuminate only the elemental area of said record surface optically associated therewith, a partially reflecting surface positioned within said housing on said optical axis intermediate said lens means and said record surface, said record surface, said light-admitting aperture, said partially reflecting surface, and said scanning means so oriented that all light received by said record surface has been transmitted through said light-transmitting apertures and said partially reflecting surface, light-modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures and thereafter reflected from said partially reflecting surface to produce an electrical signal, said light modulating means and said electrical signal of said photoelectric means connected by electrical means adapted to provide the optimum light intensity for the exposure of every elemental area of said record surface, thereby producing the optimum overall exposure of said record surface.

12. An automatic camera system comprising, in combination, a supporting housing having at least one wall, a light-admitting aperture in said wall having an axis, lens means positioned on said axis, said lens means having an optical axis and at least one focal plane within said housing, an object field external to said housing so positioned that at least a portion of the light therefrom is transmitted through said aperture and said lens means, a light-sensitive record surface so positioned within said housing that at least a portion of the light admitted through said aperture from said object field and transmitted through said lens means is transmitted thereto, said record surface having a predetermined exposure area, said predetermined exposure area having substantial width and height dimensions, said object field consisting of a multiplictiy of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means positioned within said housing, said scanning means including an opaque surface substantially transverse to said optical axis, said opaque surface positioned substantially in a focal plane of said lens means and intermediate said light-admitting aperture and said record surface, said opaque surface having a series of light-transmitting apertures therein, each aperture of said series of apertures displaced from every other aperture of said series and arranged in such a manner that the operation of said scanning means causes light from each elemental area of said object field to illuminate only the elemental area of said record surface optically associated therewith, said record surface, said light-admitting aperture, and said scanning means so oriented that all light received by said record surface has been transmitted through said light-transmitting apertures, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures to produce an electrical signal, means for providing an electrical reference signal corresponding to a predetermined light intensity dependent upon the characteristics of said record surface, means for comparing said electrical signal produced by said photoelectric means with said electrical reference signal, means responsive to said means for comparing for producing a corrective electrical signal, said corrective electrical signal applied to said light modulating means in such direction as to provide the optimum light intensity for the exposure of every elemental area of said record surface, thereby producing the optimum overall exposure of said record surface.

13. An automatic camera system comprising, in combination, a supporting housing having at least one wall, a light-admitting aperture in said wall having an axis, lens means positioned on said axis, said lens means having an optical axis and at least one focal plane within said housing, an object field external to said housing so positioned that at least a portion of the light therefrom is transmitted through said aperture and said lens means, a light-sensitive record surface so positioned within said housing that at least a portion of the light admitted through said aperture from said object field and transmitted through said lens means is transmitted thereto, said record surface having a predetermined exposure area, said predetermined exposure area having substantial width and height dimensions, said object field consisting of a multiplicity of elemental areas, said predetermined exposure area having an elemental area optically associated with every elemental area of said object field, every elemental area of said predetermined exposure area having width and height dimensions oriented similarly to and substantially less than the width and height dimensions of said predetermined exposure area, scanning means positioned within said housing, said scanning means including an opaque surface substantially transverse to said optical axis, said opaque surface positioned substantially in a focal plane of said lens means and intermediate said light-admitting aperture and said record surface, said opaque surface having a series of light-transmitting apertures therein, each aperture of said series of apertures displaced from every other aperture of said series and arranged in such a manner that the operation of said scanning means causes light from each elemental area of said object field to illuminate only the elemental area of said record surface optically associated therewith, said record surface, said light-admitting aperture, and said scanning means so oriented that all light received by said record surface has been transmitted through said light-transmitting apertures, light modulating means operatively associated with said record surface and said housing for modulating the intensity of the light transmitted from every elemental area of said object field through said light-transmitting apertures of said scanning means to the elemental area of said record surface optically associated therewith, photoelectric means operatively associated with said scanning means responsive to the intensity of light transmitted from each elemental area of said object field through said light-transmitting apertures and reflected from said record surface to produce an electrical signal, said light modulating means and said electrical signal of said photoelectric means connected by electrical means adapted to provide the optimum light intensity for the exposure of every elemental area of said record surface, thereby producing the optimum overall exposure of said record surface.

References Cited in the file of this patent

UNITED STATES PATENTS

| | | |
|---|---|---|
| 1,762,231 | Karolus | June 10, 1930 |
| 2,655,848 | Gray | Oct. 20, 1953 |
| 2,772,598 | Hotine | Dec. 4, 1956 |